Figure 1:
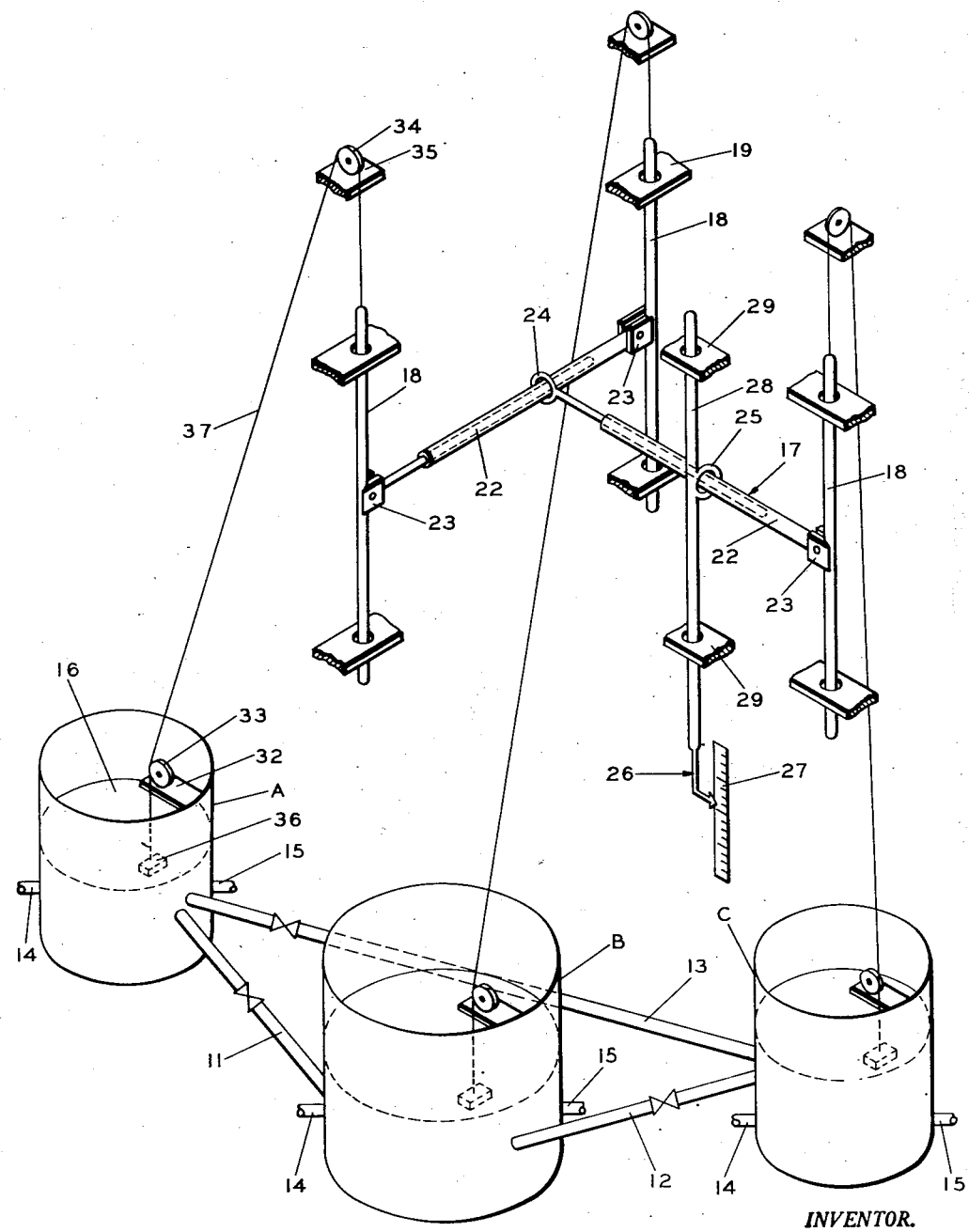

Sept. 18, 1951    J. R. PETTIGROVE    2,568,361
LIQUID VOLUME INDICATOR

Filed Oct. 27, 1947    3 Sheets-Sheet 1

INVENTOR.
J.R. PETTIGROVE
BY Hudson and Young
ATTORNEYS

Sept. 18, 1951     J. R. PETTIGROVE     2,568,361
LIQUID VOLUME INDICATOR

Filed Oct. 27, 1947     3 Sheets-Sheet 3

INVENTOR.
J. R. PETTIGROVE

BY *Hudson and Young*

ATTORNEYS

Patented Sept. 18, 1951

2,568,361

UNITED STATES PATENT OFFICE 2,568,361

LIQUID VOLUME INDICATOR

John R. Pettigrove, Bartlesville, Okla., assignor to Phillips Petroleum Company, a corporation of Delaware Application October 27, 1947, Serial No. 782,250

3 Claims. (Cl. 73—311)

This invention relates to liquid volume indicators. In one of its more specific aspects it relates to apparatus for indicating loss or gain in drilling fluid volume. In another of its more specific aspects it relates to a method for measuring the gain or loss of drilling fluid volume. In another of its more specific aspects it relates to a method and apparatus for locating various types of underground formations including porous and fluid bearing types.

In the drilling of wells by the method commonly known as "rotary drilling," it is common practice to circulate a drilling fluid or mud through the drill stem, into the bore hole, and up the bore hole into drilling fluid containers. By such a circulation of drilling fluid, lubrication and cooling are provided for the drill bit. The fluid is also utilized to carry away small particles of formation that are cut from the formations penetrated by the bit. When properly compounded, the fluid is used for building up a sheath on the wall of the bore hole. Such a sheath tends to prevent caving of the uncased portions of the bore hole and reduces the flow of drilling fluid from the bore hole to the formation, or the flow of formation fluid from the formation to the well bore. Another important function of the drilling fluid is to maintain a fluid column of sufficient weight and consistency to control any fluid pressures that may be encountered in underground formations.

The amount of drilling fluid required to build a sheath on the wall of the bore hole is dependent upon the porosity of the formation penetrated and to a great extent upon the permeability. In a broad sense, strata of rock within the productive limits of an oil or gas reservoir will have relatively uniform characteristics of porosity and permeability. Another important characteristic of a formation is the gas content of that particular strata. Accurate and continuous knowledge of the volume and rate of flow of the stream of drilling fluid through the well is of great importance to the driller. Conventional methods of rotary drilling have attendant defects in that the flow of drilling fluid is not immediately indicated. The attendant is usually unable to ascertain the presence of gas in the drilling fluid until a considerable amount of time has elapsed.

When gas or liquid bearing formations are penetrated and the pressure of the fluid therein is equal to or greater than the pressure of the circulating drilling fluid column, fluid from the formation will pass into the bore hole and will become entrained in the drilling fluid, thus increasing the discharge fluid volume. In such cases, where the formation fluid is a gas having sufficient volume and pressure, the gas will be entrained in the drilling fluid in the form of small bubbles. The specific gravity of that part of the drilling fluid column is in that manner decreased. If such a condition is allowed to continue the weight of a column of fluid will become insufficient to control the gas pressure in the formation. In such cases, drilling fluid and possibly the rotary drill pipe may be blown from the bore hole. Such a reaction is known as a "blow out." With present drilling methods, blow outs are not usually detected until the column of drilling fluid is too light in weight to control the formation pressure.

Upon penetration of highly porous and permeable formations, an opposite effect may be had. Drilling fluid which is not sufficiently thickened may in its circulation flow into the porous formation without forming a sheath thereover. In such a situation, the drilling fluid may not complete its circulation through the well bore in a quantity sufficient to carry the formation cuttings out of the well. In such a situation, the cuttings would tend to settle downwardly in the well bore and collect and pack around the bit. Under such circumstances the chances of twisting off the drill stem are quite great.

If the driller can constantly ascertain the volume of drilling fluid within the circulation system, he can very effectively control drilling operations in accordance with the formation penetrated. In conventional rotary drilling operations, it has been found desirable to utilize a plurality of drilling mud fluid containers in the system. By utilization of the plurality of containers, better settling of the cuttings from the fluid is obtained. Another advantage is that when steel tanks are used for containers it is easier to move a plurality of smaller tanks than to move one large one. When using such a plurality of containers, it has been quite difficult for the driller to account for the drilling fluid within the system. One method proposed to aid the driller in controlling the drilling fluid flow was to install drilling fluid meters at the inlet to and the outlet from a bore hole. By that manner the drilling fluid was to be metered as it was fed into the bore hole and was also to be metered as it flowed therefrom. The difference between the two meter readings was to indicate to the driller any loss or gain in the drilling fluid volume. Such a method has proved unsatisfactory due to the fact that the drilling fluid tends to cake in the meter and the formation cuttings carried within the drilling fluid circulation make it almost impossible to meter such fluid.

An object of the invention is to provide an improved means for indicating total liquid volume contained within a plurality of containers. Another object of the invention is to provide means for indicating change in drilling fluid volume during rotary drilling operations. Another object of the invention is to provide means to aid in preventing blow-outs in rotary drilling operations. Another object is to provide an improved means for locating various types of underground formations. Another object of the invention is to provide means for indicating liquid volume contained within a plurality of containers, with the greatest possible economy. Other and further objects and advantages will be apparent to those skilled in the art, upon reference to the accompanying discussion and the diagrammatic drawings.

Figure 2:
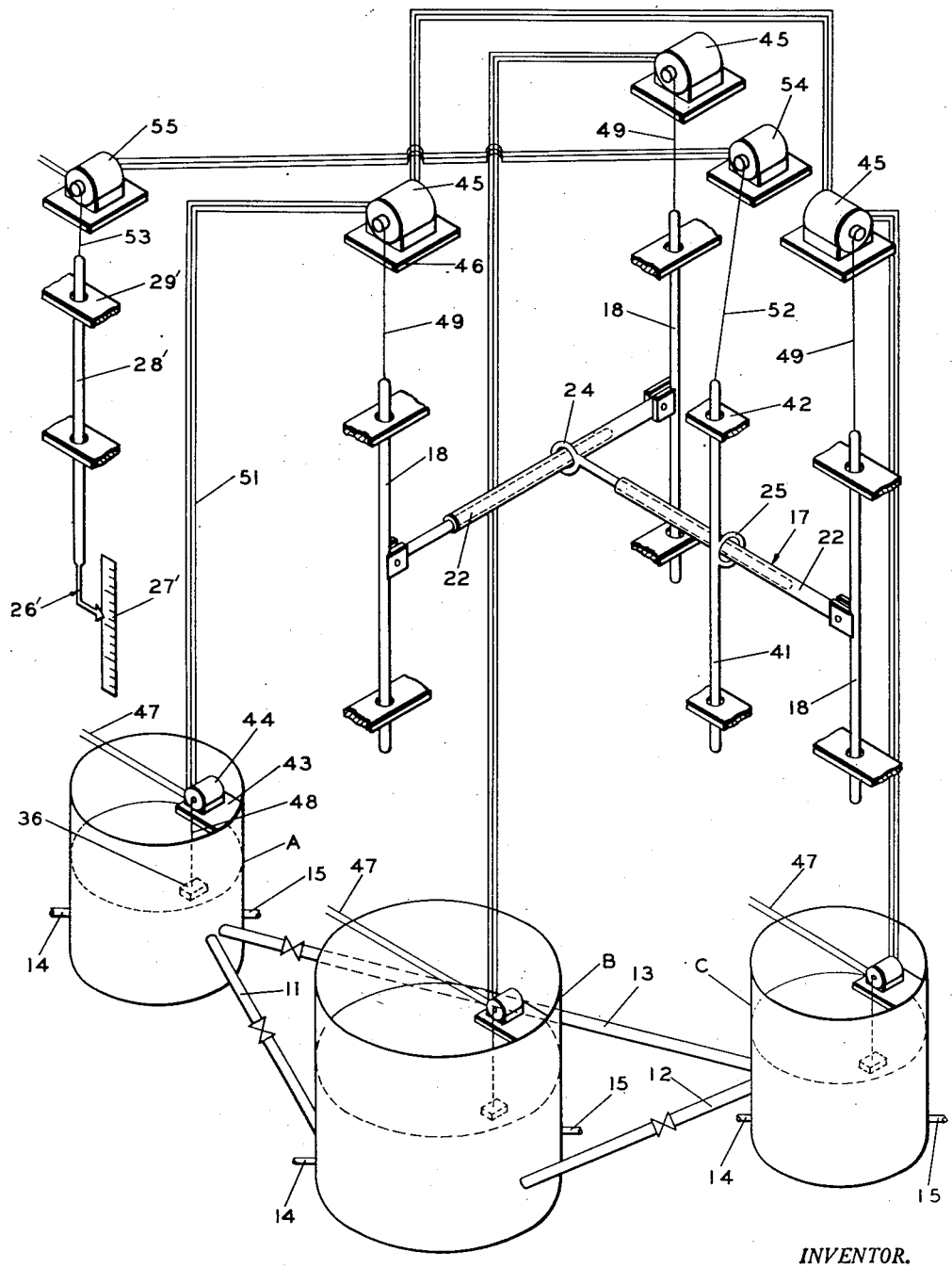
Figure 3:
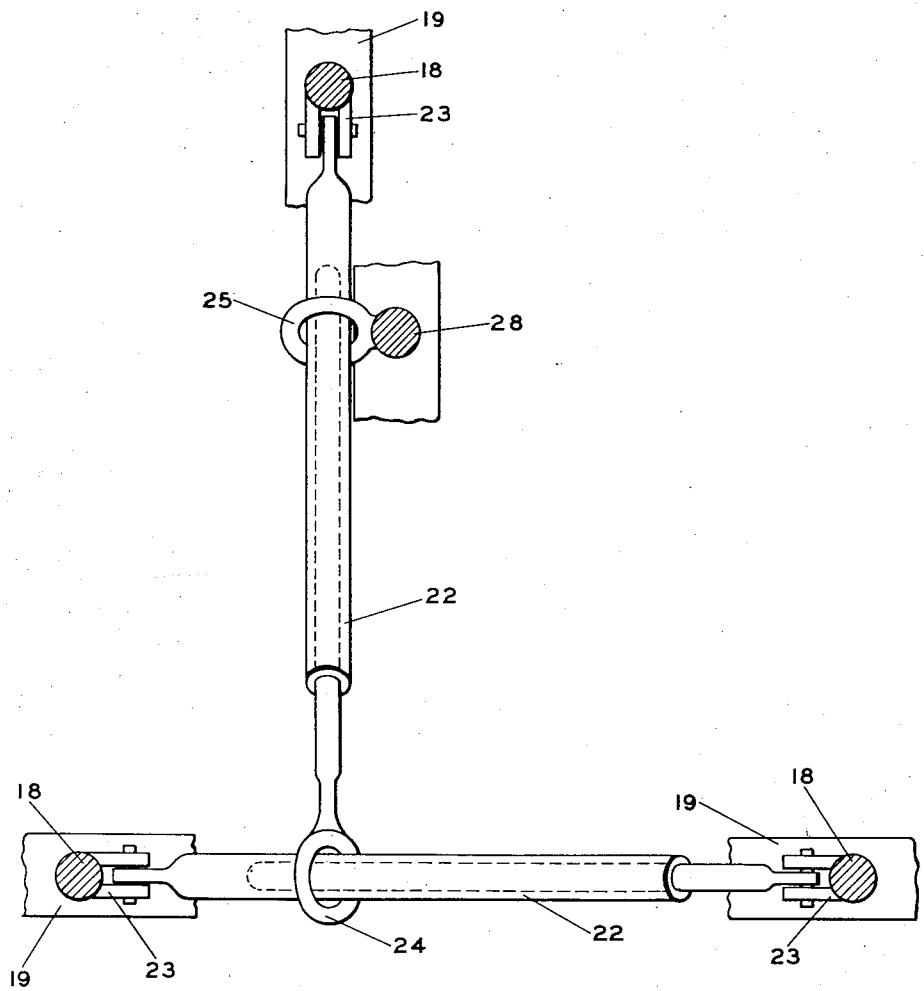

The present invention provides a solution for many of the problems set forth above. Understanding of the invention will be facilitated by reference to the accompanying diagrammatic drawings. Figure 1 is a diagrammatic representation of a system showing a preferred embodiment of the invention. Figure 2 is a diagrammatic representation of a system showing a modification of the invention. Figure 3 is a plan view of integrator means of Figure 1.

In Figure 1, containers, such as tanks A, B and C, connected by conduit means, such as conduits 11, 12 and 13, form a drilling fluid supply source. Drilling fluid inlet means, such as conduits 14, and drilling fluid outlet means, such as conduits 15, connect the drilling fluid supply source with a bore hole, not shown. Drilling fluid 16, such as a combination of bentonite, clay and water, conventionally used in drilling operations, forms a level within tanks A, B and C. Integrator means 17 comprises a plurality of slide means, such as members 18, which are movable linearly through bearing means, such as slides 19 and the plurality of slide members being connected by connecting means, such as link members 22. Rigid link members 22 are provided with expansion-contraction means, such as slide joints, intermediate their ends, thus allowing linear expansion or contraction thereof. Hinge means, such as lugs 23, are provided on members 18 intermediate their ends. One slide member 18 is flexibly affixed by lugs 23 to one end of a link member 22. A second slide member 18 is flexibly connected by its lugs 23 to the other end of member 22. A third slide member 18 is connected by lugs 23 to one end of a second link member 22. The other end of the second link member 22 is slidably affixed to the first link member 22 by fastening means, such as connecting ring 24. Indicating means 26 comprises an indicator panel 27 and an indicator arm 28. Indicator arm 28 is slidably mounted in bearing means, such as slides 29, so as to move linearly therethrough. Member 28 is slidably connected with the second link member by fastening means, such as connecting ring 25. Containers A, B and C are provided near their upper edges with bracket members 32 which support pulley members 33. Pulley members 34 are supported on stationary members 35. Float means, such as floats 36, are connected to members 18 by means of flexible connecting lines 37 which run through pulley members 33 and 34.

In the operation of the device shown in Figure 1, ring 24 is moved to a spot on link member 22 which is a proportional distance between the first and second slide members 18. The distance between two slide members 18 is divided by the ring 24 into distances so that the ratio of the distance between the first slide member and connecting ring 24 to the distance between connecting ring 24 and the second slide member is in indirect proportion to the ratio of a horizontal area of container A to the horizontal area of container B. As the floats in containers A and B rise and fall the first and second slide members 18 respectively will be caused to move the same distance. The effect which the movement of the first or second slide member has upon ring 24 will be directly proportional to the respective horizontal area of tank A to the horizontal area of tank B. Upon determining the proper spacing of ring 24, ring member 25 is spaced between the third slide member 18 and the first link member, in such a manner as to divide the distance therebetween so that the ratio of the distance between the first link member and connecting ring 25 to the distance between ring 25 and the third slide member is in indirect proportion to the ratio between the total horizontal area of containers A and B to the horizontal area of container C. Slides 29 are then secured in position so as to cause indicator arm 28, when it moves, to move in directions common to those taken by slide members 18 and to cause the second link member to pass through a plane parallel thereto. In this manner as ring 24 moves, it is caused to move on a line which is substantially parallel to members 18. As the first and second slide members 18 move in opposite directions, the first link member 22 will be caused to expand or contract linearly but the distance between the first and second slide members 18 will remain the same and ring 24 moving on the line parallel to the slide members will continue to divide that distance in a constant proportion. Ring 25 operates in the same manner as does ring 24, moving on member 28 on a line which is substantially parallel to that of members 18. Indicator arm 28 is caused to move by the combination of the slide members and link members and indicates a total liquid volume, contained within containers A, B and C, upon indicator panel 27. By this method of linkage between members 18 and 22, the net effect of liquid level change in any one of the liquid containers upon the indicator panel is directly proportional to the ratio of the horizontal area of that container to the sum of the horizontal areas of the other containers.

The device diagrammatically shown in Figure 2 is similar to that of Figure 1. Containers A, B and C are connected by conduit means, such as conduits 11, 12 and 13, and have drilling fluid inlet conduits 14 and drilling fluid outlet conduits 15. Integrator means 17 is similar in construction to that shown in Figure 1. First and second slide members are connected by a first link member 22 and a third slide member is serially connected thereto by means of a second link member, which is slidably affixed to the first link member 22 by means of connecting ring 24. Connecting ring 25 is slidably attached to the second link member and is affixed to connection means, such as rider member 41, which is slidably mounted in bearing means, such as slides 42. Member 41 is so mounted as to move in directions common to those taken by members 18. Indicator means 26' comprises an indicator recorder means, such as panel 27', and marker means, such as marker arm 28'. Marker arm 28' is slidably mounted in bearing means such as slides 29'. Float means, such as float 36, are provided in each fluid container. Bracket members 43 are provided near the upper edge of each fluid container and support generators 44 thereon. Motors 45 are suspended from stationary members 46. Generators 44 and motors 45 are similar in construction. They are supplied with electrical current through electric conductor lines 47 and are provided with torque means therein. The torque means maintain tension on flexible lines 48, communicating with floats 36, and flexible lines 49 communicating with slide members 18. As the float members rise or fall in response to liquid level change within the liquid containers resistance to the torque in the generator is decreased or increased, thus allowing the rotor to turn. An electric current is generated thereby, in generators 44, and is caused to pass through electric conductor lines 51 to motors 45, causing motors 45 to move flexible lines 49 and slide members 18 in direct proportion to the movement of floats 36 connected thereto. "Selsyn" self-synchronous devices, which are commercially available, are suitable for use as such generators and motors.

The operation of a device of Figure 2 is similar to that of Figure 1 in that connecting rings 24 and 25 are positioned in the same manner. Slides 42 retain rings 24 and 25 on the parallel lines described in the operation of Figure 1. Movement of member 41 is similar to the movement of member 28 of Figure 1. Member 41 communicates with generator 54 by means of flexible line 52. As member 41 moves, the torque means causes the generator to operate and an electric current is generated in generator 54 which passes to motor 55, which in turn results in the transmittal of motion directly to member 28' by means of line 53. In that manner, member 28' indicates the total liquid volume, within containers A, B and C, upon panel 27'.

The number of liquid containers in which this apparatus may be utilized is practically unlimited. As long as the link members are so serially connected as to proportion the effect of the last added slide member, communicating with a float in one of the containers, in the ratio of the total horizontal area of containers having floats with which the other slide members communicate, to the horizontal area of the container having the float with which the last added slide member communicates, this device will successfully integrate changes in the total net liquid volume of the containers.

The slide members utilized in the apparatus may be of such weight as to take up the slack in the flexible line connecting the float and slide members or to equal the torque of the motor or generator. If the weight of such members is not sufficient, additional weights may be suspended from the slide members. Another means of overcoming the torque or the weight of the line would be to attach a spring to the slide member in such a manner as to overcome the torque or take up the slack in the line.

The form of the liquid containers is limited only by the fact that the container should have a substantially constant horizontal area through the space in which the liquid level moves. The containers may be square, rectangular or circular tanks, the lower portion of which may taper to form a substantial cone or may be excavated pits, the sides of which have been secured so as to prevent caving.

*Example*

Three containers, A, B, and C, have horizontal areas of 50, 100 and 75 square feet respectively. The volume of each container respectively per vertical inch therein is 4.17, 8.33, and 6.25 cubic feet. Thus an increase of one inch in the liquid level of each container results in a total liquid volume increase of 18.75 cubic feet. A float within each container is connected to a slide member, by means of a flexible line suspended on pulleys, and causes the slide members to move in a direction opposite the movement of the float. Two slide members are slidably mounted in bearings, at set points, so as to be spaced apart at a distance of 30 inches. These slide members are connected by a first link member having a slidable joint therein. A third slide member is mounted in bearings on a line 30 inches distant from the first link member. A second link member is slidably secured to the first link member by a first connecting ring and is flexibly attached to the third slide member. The slide members are slidably mounted in their bearing members so as to move in common vertical directions. The first connecting ring is positioned and maintained on a line which is 20 inches from and parallel to the first slide member, which is connected to the float in container A. A second connecting ring is slidably secured to the second link member and is connected to an indicator arm which is also mounted in bearing members and moves in directions common to those in which the slide members move. The bearing members are fixed in place so as to hold the second connecting ring on a line which is substantially parallel to the slide members and is spaced from the third slide member by a distance of 20 inches. The float in container B is connected to the second slide member and the third slide member is connected to the float in container C. An indicator panel is positioned in close proximity to a pointer on the indicator arm and the vertical distance thereon is marked off in inches.

As the liquid levels, in containers A, B and C, rise 3 inches, 2 inches and 4 inches respectively, the float members in those containers rise the same amount and the slide member connected to each respective float falls the same amount. The effect of the rise in containers A and B upon the first slide ring is that it falls a distance of 2.33 inches and the pointer on the indicator arm falls 2.89 inches, thus indicating an increase in the liquid volume within the containers of 54.16 cubic feet.

As the liquid level in container A rises an additional 2 inches, the level in container B remains the same while the level in container C drops 3 inches. The effect of the rise in container A, upon the first connecting ring, is that it falls a distance of .67 inch while the pointer on the indicator arm rises a distance of .56 inch, thus indicating a decrease in the total liquid volume of the containers of 10.5 cubic feet.

Though the invention has been discussed and disclosed with the slide members of the integrator means substantially vertically disposed it is obvious that the apparatus may be so modified as to place the integrator in any position.

As will be evident to those skilled in the art, various modifications of this invention can be made or followed in the light of the foregoing disclosure and discussion without departing from the spirit or scope of the disclosure or from the scope of the claims.

As drilling fluid flows through a well bore, cuttings are replaced in the well bore by drilling fluid and the cuttings are carried to drilling fluid containers, thus substantially maintaining the drilling fluid volume. It will thus be seen that the volume of drilling fluid will remain substantially constant or may diminish or increase slowly by reason of loss to or gain of fluid from formations throughout the length of the well bore. As pointed out above, formations may be sealed off by drilling fluid, thus reducing the loss to or gain in fluid from such formations. As new formations are penetrated their structure may be indicated in the drilling fluid volume. It is common practice in the drilling of wells to log the depth of the well against the time at which that depth was reached. Drilling fluid volume may also be continuously recorded during the drilling operation. By recording drilling fluid volume against time in conjunction with the recording of well depth against time, it will be possible to locate and characterize formations penetrated. Let us consider, for example, a case in which the drilling fluid volume has remained substantially constant and at a given time shows a sharp decrease only to substantially level off again after a length of time. By checking the depth at the time of the two changes in fluid volume it will be possible to determine the depths within which a porous formation was found. This is conversely true if the volume of drilling fluid should sharply increase at a given time. It would thus be possible to determine the depth of a formation from which fluid is escaping.

I claim:

1. A device for indicating the total liquid volume contained in a plurality of containers, each container having a substantially constant horizontal area therethrough, said device comprising a float member in each said container; a plurality of slide members, each said slide member, connected to, movable linearly in response to, and movable in direct proportion to the movement of one of said float members, said slide members being movable in common directions; rigid link members having expansion-contraction means therein being serially connected and connecting said slide members together, a first said link member extending between two said slide members and being flexibly connected to said slide members, and each successive said link member flexibly connected at one of its ends to another said slide member intermediate its ends and connected at its other end to the next preceding link member in said series on a first plane intermediate its ends, said first plane being parallel the direction of movement of said slide members, the ratio of the distance from said connection to one end of said next preceding link to the distance from said connection to the other end of said next preceding link being in indirect proportion to the total horizontal area of containers containing floats which are connected to one end of said next preceding link member, to the horizontal area of a container containing a float which is connected to the other end of said next preceding link member; and an indicator member slidably connected to the last said link member in said series on a second plane intermediate the ends of said last link member, said second plane being parallel the direction of movement of said slide members, the ratio of the distance from said connection to one end of said last link to the distance from said connection to the other end of said last link being in indirect proportion to the total horizontal area of containers containing floats which are connected to one end of said last link, to the horizontal area of a container containing a float which is connected to the other end of said last link, whereby movement of said indicator member when liquid level change occurs in any one container is directly proportional to the amount of liquid level change in said chamber in the ratio of the horizontal area of the container in which liquid level change occurs to the sum of the horizontal areas of the other containers.

2. A device for indicating the total liquid volume contained in a plurality of containers, each container having a substantially constant horizontal area therethrough and which containers are of unequal horizontal area, said device comprising a float member in each said container; a plurality of slide members, each said slide member, connected to, movable linearly in response to, and movable in direct proportion to the movement of one of said float members, said slide members being movable in common directions; rigid link members having slidable joints therein being serially connected and connecting said slide members together, a first said link member extending between two said slide members and being flexibly connected to said slide members intermediate the ends of said slide members, and each successive said link member flexibly connected at one of its ends to another said slide member intermediate its ends and slidably connected at its other end to the next preceding link member in said series on a first plane intermediate its ends, said first plane being parallel the direction of movement of said slide members, the ratio of the distance from said slidable connection to one end of said next preceding link to the distance from said slidable connection to the other end of said next preceding link being in indirect proportion to the total horizontal area of containers containing floats which are connected to one end of said next preceding link member, to the horizontal area of a container containing a float which is connected to the other end of said next preceding link member; and an indicator member slidably connected to the last said link member in said series on a second plane intermediate the ends of said last link member, said second plane being parallel the direction of movement of said slide members, the ratio of the distance from said slidable connection to one end of said last link to the distance from said slidable connection to the other end of said last link being in indirect proportion to the total horizontal area of containers containing floats which are connected to one end of said last link, to the horizontal area of a container containing a float which is connected to the other end of said last link, whereby movement of said indicator when liquid level change occurs in any one container is directly proportional to the amount of liquid level change in said chamber in the ratio of the horizontal area of the container in which liquid level change occurs to the sum of the horizontal areas of the other containers.

3. A device for indicating the total liquid volume contained in a plurality of containers, each container having a substantially constant horizontal area therethrough and which containers are of unequal horizontal area, said device comprising a float member in each said container; a plurality of slide members, each said slide member, connected to, movable linearly in response to, and movable in direct proportion to the movement of one of said float members, said slide members being movable in common directions; rigid link members having slidable joints therein being serially connected and connecting said slide members together, a first said link member extending between two said slide members and being hinged to said slide members intermediate the ends of said slide members, and each successive said link member flexibly connected at one of its ends to another said slide member intermediate its ends and slidably connected at its other end to the next preceding link member in said series on a first plane intermediate its ends, said first plane being parallel the direction of movement of said slide members, the ratio of the distance from said slidable connection to one end of said next preceding link to the distance from said slidable connection to the other end of said next preceding link being in indirect proportion to the total horizontal area of containers containing floats which are connected to one end of said next preceding link member, to the horizontal area of a container containing a float which is connected to the other end of said next preceding link member; and an indicator member slidably connected to the last said link member in said series on a second plane intermediate the ends of said last link member, said second plane being parallel the direction of movement of said slide members, the ratio of the distance from said slidable connection to one end of said last link to the distance from said slidable connection to the other end of said last link being in indirect proportion to the total horizontal area of containers containing floats which are connected to one end of said last link, to the horizontal area of a container containing a float which is connected to the other end of said last link, whereby movement of said indicator member when liquid level change occurs in any one container is directly proportional to the amount of liquid level change in said chamber in the ratio of the horizontal area of the container in which liquid level change occurs to the sum of the horizontal areas of the other containers.

JOHN R. PETTIGROVE.

REFERENCES CITED

The following references are of record in the file of this patent:

UNITED STATES PATENTS

| Number | Name | Date |
| --- | --- | --- |
| 1,467,853 | Heinold | Sept. 11, 1923 |
| 2,025,774 | Rennick et al. | Dec. 31, 1935 |
| 2,179,822 | Imm | Nov. 14, 1939 |
| 2,193,095 | Harrison | Mar. 12, 1940 |
| 2,229,156 | Wertheimer | Jan. 21, 1941 |